(12) United States Patent
Fox et al.

(10) Patent No.: US 6,751,548 B2
(45) Date of Patent: Jun. 15, 2004

(54) MATCHING STORED ROUTES TO A REQUIRED ROUTE

(76) Inventors: Max Fox, 366 N. Broadway, Suite 410, Jericho, NY (US) 11753; Isabelle Boulard, 350 Duke of Kent, Pointe-Claire QC (CA), H9R 1Y9

( * ) Notice: Subject to any disclaimer, the term of this patent is extended or adjusted under 35 U.S.C. 154(b) by 15 days.

(21) Appl. No.: 10/007,940

(22) Filed: Nov. 20, 2001

(65) Prior Publication Data

US 2002/0069015 A1 Jun. 6, 2002

Related U.S. Application Data

(60) Provisional application No. 60/252,024, filed on Nov. 20, 2000.

(51) Int. Cl.$^7$ .............................................. G01C 21/34
(52) U.S. Cl. ....................................... 701/201; 701/209
(58) Field of Search ................................ 701/202, 201, 701/209, 210

(56) References Cited

U.S. PATENT DOCUMENTS

| | | | |
|---|---|---|---|
| 5,523,950 A | | 6/1996 | Peterson |
| 5,799,263 A | | 8/1998 | Culbertson et al. |
| 5,835,716 A | | 11/1998 | Hunt et al. |
| 5,845,228 A | * | 12/1998 | Uekawa et al. ............. 701/209 |
| 5,880,958 A | | 3/1999 | Helms et al. |
| 5,922,040 A | | 7/1999 | Prabhakaran et al. |
| 6,014,607 A | * | 1/2000 | Yagyu et al. ............... 701/202 |
| 6,088,648 A | | 7/2000 | Shah et al. |
| 6,182,008 B1 | | 1/2001 | Nikiel et al. |
| 6,192,314 B1 | | 2/2001 | Khavakh et al. |
| 6,253,146 B1 | | 6/2001 | Hanson et al. |
| 2001/0037174 A1 | * | 11/2001 | Dickerson ................... 701/200 |
| 2001/0056363 A1 | * | 12/2001 | Gantz et al. ................... 705/9 |

OTHER PUBLICATIONS

Carpool Matching Website Can Be Used By Any Commuter, Worldwide; The Urban Transportation Monitor; Jul. 20, 2001; vol. 15, No. 14.*
Carpoolworld.com Revolutionizes Carpool Matching; Press Release; Jul. 12, 2001; Datasphere Corporation; www.carpoolworld.com.*
Prasuna DVG Reddy GIS Based Real–Time Rideshare Matching 1994, 7 pages Academic Paper ITS, Uni. of California, Davis, CA–95616. internet url: www.odyssey-.maine.edu/gisweb/spatdb/gis–lis/gi94082.html.
Meridian World Data (web page) Distance Calculations Last updated: Mar. 30, 2001, 4 pages internet url: www.meridianworlddata.com/distancecalculation.asp.
D.J. Dailey et al. Seattle smart traveler Jan. 12, 1997, 13 pages internet url: www.its.washington.edu/pubs/trb97sst.pdf.

* cited by examiner

*Primary Examiner*—Michael J. Zanelli

(57) ABSTRACT

A computer-implementable method for identifying the preferred route to be used, or ordering a set of routes to be used in order of preferability, for a given route requirement, in a computationally efficient manner is disclosed. The computer-implementable method selects a subset of stored routes having origins within a configurable radius of the required origin and destinations within a configurable radius of the required destination, calculates the distances between the two origins, between the two destinations, and between each origin and its corresponding destination, to compute various indicators of the similarity between the required route and each stored route in the subset. The computer-implementable method presents the selected stored routes ordered by a selected route-similarity indicator. The first such ordered selected stored route is the preferred route.

14 Claims, 2 Drawing Sheets

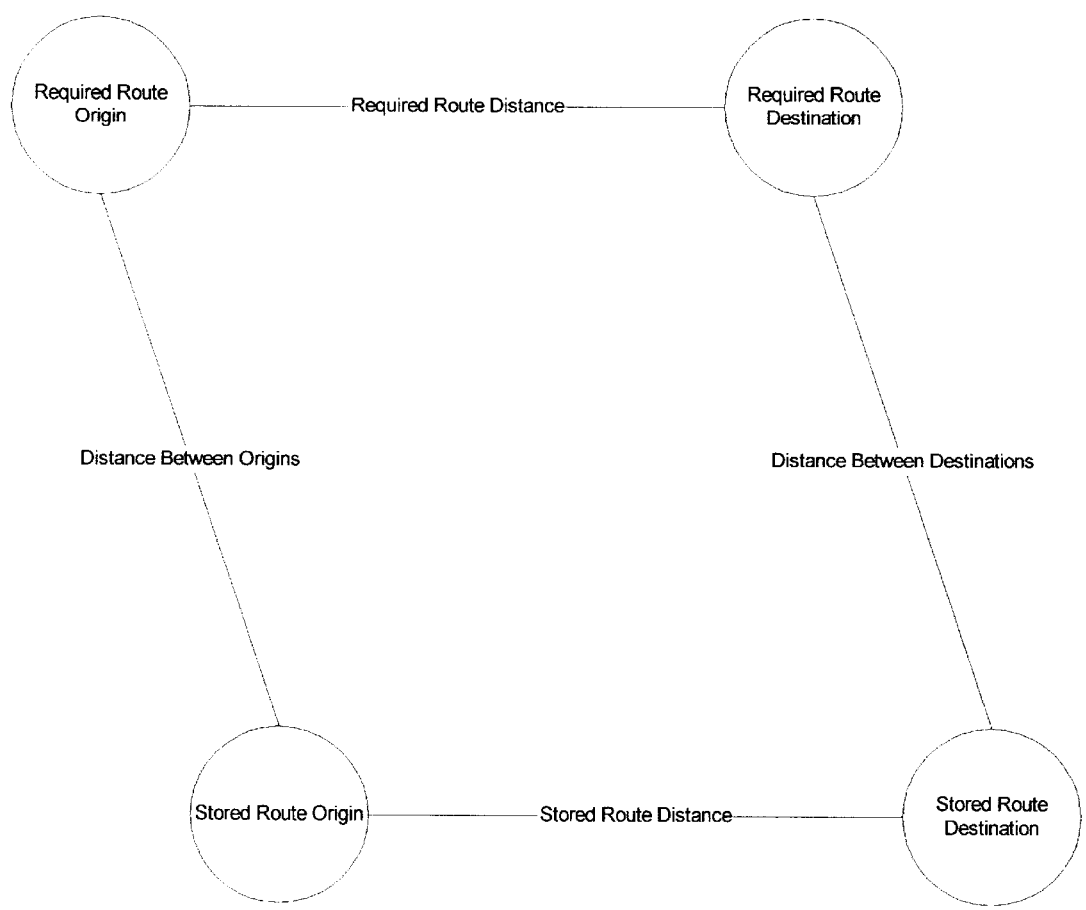

US 6,751,548 B2

MATCHING STORED ROUTES TO A REQUIRED ROUTE

This application is entitled to the benefit of Provisional Patent Application Ser. No. 60/252,024, filed Nov. 20, 2000.

FIELD OF THE INVENTION

The present invention relates to computerized mapping software programs, and more specifically, to computerized mapping software programs that match stored routes to a given route by calculating indicators of similarity between the given route and each stored route and identifying the best stored route or routes by ordering the stored routes by a selected indicator of similarity.

BACKGROUND OF THE INVENTION

The widespread use of single-occupancy vehicles (SOVs) in modern industrialized societies is known to be a significant cause of several major economic, social and environmental problems including the inefficient use of energy resources, higher than necessary traffic congestion and higher than necessary levels of air pollution.

The alternatives of mass transportation, telecommuting or non-congesting/non-polluting modes of transportation are only available to limited segments of the population. A universal alternative to the use of SOVs is the use of high-occupancy vehicles (HOVs), where multiple individuals share a single vehicle. The efficient sharing of vehicles can only occur when the savings of the shared trip are greater than the costs of the individuals coming together to share the single vehicle. A system to determine which individuals should share a vehicle must analyze the locations of the origins (homes) and destinations (places of work) of all the individuals within its scope and group people together based on how close together they live and how close together they work. Alternatively, people can also be grouped to share a vehicle based on the extent to which all of their origins and destinations lie on a straight line.

Several existing products, primarily Internet websites, provide ride-matching services. None of the existing products, however, other than those identified herein as implementations of the present invention, include all four key elements of a complete and maximally efficient ride-matching process, those four elements being full computerization to provide instant automatic results without requiring Human intervention, the capability to match routes with a degree of precision necessary to quantify preferability between matches within short walking distances (less than 100 yards), the capability to function anywhere on the planet using existing global locating references, and the ability to perform efficiently independent of the quantity of stored routes.

Accordingly, the present invention is the first method and system that is fully automatic, precise within short walking distances (less than 100 yards), applicable anywhere on Earth using existing global locating references, and efficient at all levels of quantity of stored routes.

The invention is currently implemented both as the operating Internet website www.carpoolworld.com and as a downloadable software application available at that website.

SUMMARY OF THE INVENTION

The present invention achieves all of the objectives described above by providing a computer-implementable method of storing routes and matching stored routes to a given route that is computationally-efficient.

To make the system precise and globally-applicable, it is based on the direct use of standard latitude and longitude coordinates. Several free publicly available resources, including the Internet websites of the United States Geological Survey and the United States Census Bureau, provide latitude and longitude information. Some websites provide geographic information for specific street addresses in the United States, Canada and several European countries, providing latitude and longitude coordinates to a precision of approximately 6 inches. Some websites provide a graphical point-and-click capability to obtain the latitude and longitude coordinates for any point on the planet's surface. Additionally, Global Positioning System (GPS) devices can be obtained by the public that provide latitude and longitude information readings wherever they are used on the planet to a precision of about 30 feet. Additional resources are available in various printed reference resources.

To make the system computationally-efficient, routes are stored in a standard relational database management system (RDBMS) using multiple indexes that automatically order the routes simultaneously by origin latitude, origin longitude, destination latitude and destination longitude. When a required route is specified, the system uses configurable radii to establish target ranges for each of the four locating numbers, allowing the extraction process to efficiently identify the subset of best matches before making the computational effort to access the full set of data for each route and before computing all the distances.

Once the subset of best matches is identified, the system uses an efficient mathematical equation to calculate the distances. The selection, computation and ordering of the routes is done using a standard SQL (Structured Query Language) statement.

Although it will be apparent to all those skilled in the art that the straight-line calculations do not take into consideration actual road network layouts, in point of fact, for the purposes of the intended application, the layout of actual road networks is not relevant. For example, in the cases of two neighbors residing on back-to-back properties or at opposite ends of a neighborhood park, the direct-line distance between their homes is more important than the street-wise path from one driveway to the other. Similarly, the precise length of the navigational distance between each origin and its destination is not relevant to the objective of matching the origins to eachother and matching the destinations to eachother.

Also, it will be apparent to those skilled in the art that the mathematical formulae employed in the present invention provide mathematical approximations and are subject to various problems resulting from the exact geometry of the planet. In fact, many variables, such as topographical variations, unpredictable road-work situations and the general complexities of the planetary shape adversely affect the ability to calculate precise distances. However, since the necessary objective of the formulae used in the present invention is to distinguish between closely-placed (less than a 100 yards) locations, the formula used is accurate and consistent and efficient.

BRIEF DESCRIPTION OF THE DRAWINGS

FIG. 2—Illustration of the required route and a stored route.

DETAILED DESCRIPTION OF THE PREFERRED EMBODIMENT

Figure 1:
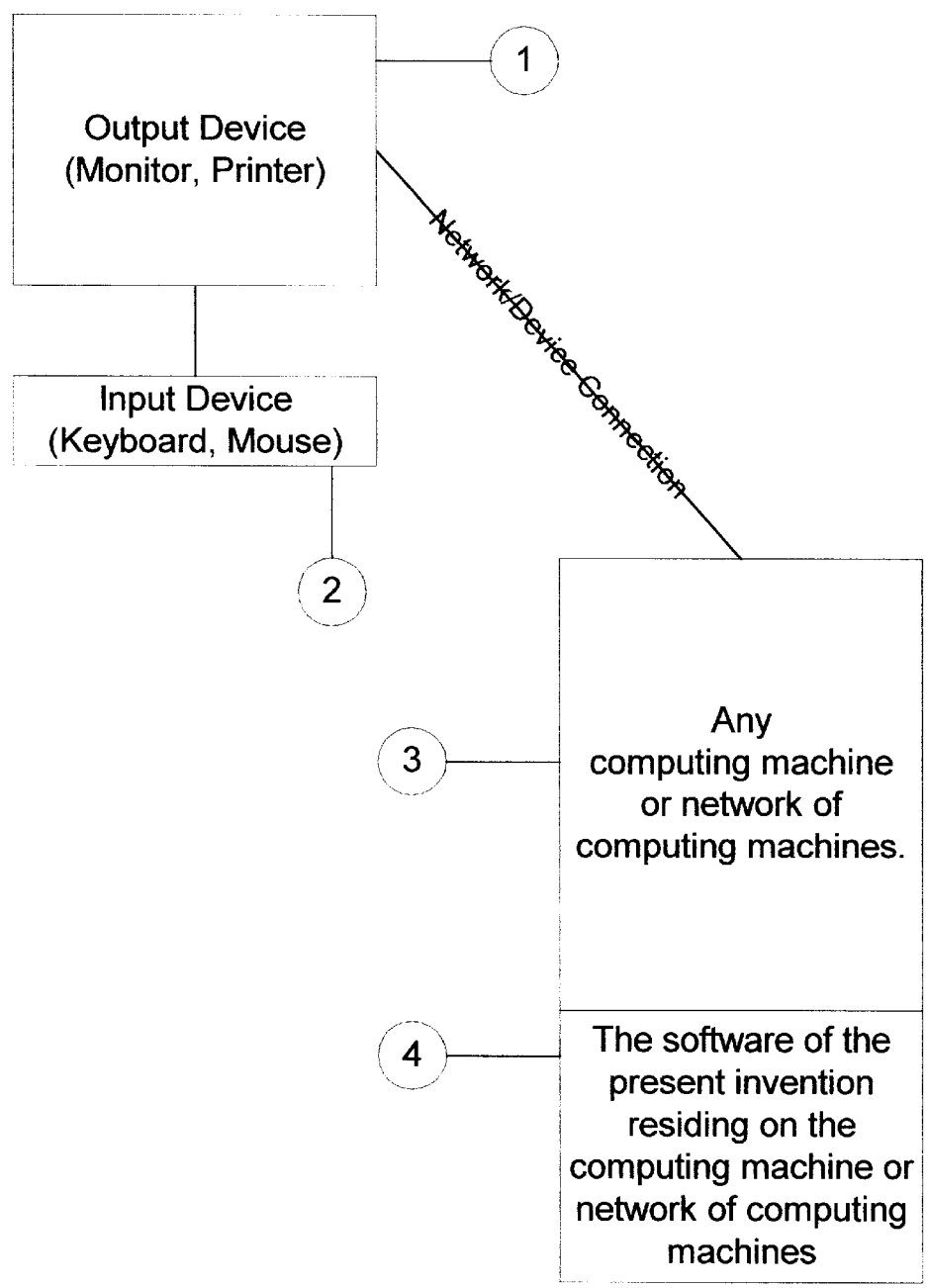
FIG. 1—Illustration of the computing machine including the software of the present invention.

FIG. 1 illustrates the software of the present invention installed and operating on any computing machine. Item 1 is the output device, typically a display monitor but may be any device transmitting the software's output to the user. Item 2 is the input device, typically a keyboard and/or mouse but may be any input device transmitting the user's input to the software. Item 3 is any computing machine or network of computing machines. Item 4 is the software of the present invention. The input and output devices are connected to the computing machine or network of computing machines by any kind of wired or wireless connection. Components of the software of the present invention may reside on any component of the computing machine or network of computing machines.

FIG. 2 illustrates the comparison of the required route and a stored route, for reference in the following description of the preferred embodiment.

The invention may be implemented in a suitable computing environment as illustrated in FIG. 1.

With reference to FIG. 2, the software of the present invention will perform as follows:

1) The user inputs a route identification, the latitude and longitude coordinates of the route origin and destination, and optionally some non-spatial route selection criteria or descriptive information. If the input device is capable of sensing latitude and longitude coordinates with a built-in geographic locator, such as GPS, the software may automatically input the current latitude and longitude coordinates. The software may also input locating information in a format other than direct input of latitude and longitude and translate it to latitude and longitude. The software may also have previously stored locations for the user such as 'school', 'work', 'home', or other, which the user can select as one of the route endpoints.

ROLAT: Required Route Origin Latitude
ROLON: Required Route Origin Longitude
RDLAT: Required Route Destination Latitude
RDLON: Required Route Destination Longitude Storing Each Route 2) If the user stores the route, the software records it with a primary retrieval index on the route identification, and four secondary retrieval indexes on each of the elements of the origin and destination geographic coordinates, those being origin latitude, origin longitude, destination latitude and destination longitude.

Searching for Matches

3) The software determines an appropriate search radius for the origin and an appropriate search radius for the destination. Any manually set or calculated value can be used for either the origin radius or the destination radius. A calculated radius value can be determined by a computation based on the expected demographically-related distribution of the stored routes, or the actual distribution of the current or historical stored routes. The user may also input a desired origin radius or destination radius.

ORAD: Origin Radius
DRAD: Destination Radius

4) In conjunction with the determination of the search radii, the software may determine a looping factor or employ an algorithm to repeat the searching step with increasing radii to include a greater subset of stored routes. This algorithm may be constructed to avoid re-reading routes that have already been selected within the smaller radii, however, because the purpose of increasing the radius would be because of an insufficient quantity of selected routes in the prior pass, the processing effort of re-reading those routes would be insignificant.

Note: for the purposes of these descriptions, the value of 69.1 miles will be used as the distance of a single degree of latitude and the value of a single degree of longitude at the Equator, However, a more precise value can be used without materially affecting the described process.

5) The software determines a range for the origin longitude by dividing the origin radius by the product of 69.1 and the cosine of the origin latitude and adding and subtracting that value from origin longitude.

OLONFROM: Origin Longitude From:
OLONFROM=ROLON−(ORAD/(69.1*COS(ROLAT)))
OLONTO: Origin Longitude To:
OLONTO=ROLON+(ORAD/(69.1*COS(ROLAT)))

6) The software determines a range for the origin latitude by dividing the origin radius by 69.1 and adding and subtracting that value from origin latitude.

OLATFROM: Origin Latitude From:
OLATFROM=ROLON−(ORAD/69.1)
OLATTO: Origin Latitude To:
OLATTO=ROLON+(ORAD/69.1)

7) The software determines a range for the destination longitude by dividing the destination radius by the product of 69.1 and the cosine of the destination latitude and adding and subtracting that value from destination longitude.

DLONFROM: Destination Longitude From:
DLONFROM=RDLON−(DRAD/(69.1*COS(RDLAT)))
DLONTO: Destination Longitude To:
DLONTO=RDLON+(DRAD/(69.1*COS(RDLAT)))

8) The software determines a range for the destination latitude by dividing the destination radius by 69.1 and adding and subtracting that value from destination longitude.

DLATFROM: Destination Latitude From:
DLATFROM=RDLON−(DRAD/69.1)
DLATTO: Destination Latitude To:
DLATTO=RDLON+(DRAD/69.1)

9) The software selects the stored routes within the determined ranges, calculates the route proximity indicators and orders the results by a selected route proximity indicator.

Although the method described herein can be implemented in other computer languages, the present invention uses a standard SQL computer language statement as follows:

SOLAT=Stored Route Origin Latitude
SOLON=Stored Route Origin Longitude
SDLAT=Stored Route Destination Latitude
SDLON=Stored Route Destination Longitude
select route_identification, status, group, SOLON, SOLAT, SDLON, SDLAT,
truncate(sqrt(pow((SOLAT−ROLAT)*69.1,2)+pow((SOLON−ROLON)*cos(radians((SOLAT+ROLAT)/2))*69.1,2)),3)as ORIGINS_DISTANCE,
truncate(sqrt(pow((SDLAT−RDLAT)*69.1,2)+pow((SDLON−RDLON)*cos(radians((SDLAT+RDLAT)/2))*69.1,2)),3)as DESTINATIONS_DISTANCE,
abs(sqrt(pow((SOLAT−ROLAT)*69.1,2)+pow((SOLON−ROLON)*cos(radians((SOLAT+ROLAT)/2))*69.1,2))+sqrt(pow((SOLAT−SDLAT)*69.1,2)+pow((SOLON−SDLON)*cos(radians((SOLAT+SDLAT)/2))*69.1,2))+sqrt(pow((SDLAT−RDLAT)*69.1,2)+pow((SDLON−RDLON)*cos(radians((SDLAT+RDLAT)/2))*69.1,2))−PREVIOUSLY_CALCULATED_REQUIRED_ROUTE_DISTANCE) as REQUIRED_ROUTE_DETOUR,
abs(sqrt(pow((SOLAT−ROLAT)*69.1,2)+pow((SOLON−ROLON)*cos(radians((SOLAT+ROLAT)/2))*69.1,2))−sqrt(pow((SOLAT−SDLAT)*69.1,2)+pow((SOLON−

SDLON)*cos(radians((SOLAT+SDLAT)/2))*69.1,2))+
sqrt(pow((SDLAT−RDLAT)*69.1,2)+pow((SDLON−
RDLON)*cos(radians((SDLAT+RDLAT)/2))*69.1,2))+
PREVIOUSLY_CALCULATED_REQUIRED_
ROUTE_DISTANCE) as STORED_ROUTE_
DETOUR,
truncate((sqrt(pow((SOLAT−ROLAT)*69.1,2)+pow
((SOLON−ROLON)*cos(radians((SOLAT+ROLAT)/2))
*69.1,2))+sqrt(pow((SDLAT−RDLAT)*69.1,2)+pow
((SDLON−RDLON)*cos(radians((SDLAT+RDLAT)/2))
*69.1,2))),3) as DISTANCE_BETWEEN_
COMMUTES
from STORED_ROUTES_FILE
where
STATUS='ACTIVE' and GROUP=REQUIRED_GROUP and
SOLON between OLONFROM and OLONTO and
SOLAT between OLATFROM and OLATTO and
SDLON between DLONFROM and DLONTO and
SDLAT between DLATFROM and DLATTO
having (ORIGINS_DISTANCE<=(ORAD*COS((ROLAT+SOLAT)/2)) and (DESTINATIONS_DISTANCE<=(DRAD*COS((RDLAT+SDLAT)/2))
order by SELECTED—PROXIMITY—INDICATOR Explanation of the SQL Statement The select clause retrieves and makes available data elements obtained from the stored route. It also calculates new data elements based on the retrieved elements. According to the standard design of SQL query optimizers, the data elements in the select clause are not retrieved or calculated unless the where clause is satisfied. The select clause used in the present invention calculates the distance between the origins, the distance between the destinations, the detour from the required route to the stored route, the detour from the stored route to the required route, and the overall proximity between the two routes being the sum of the distances between the origins and destinations.

The from clause specifies the database file to be accessed for the desired data.

The where clause specifies the primary selection criteria. Standard SQL query optimizers will only retrieve the full set of data elements from the file if the where clause is satisfied. By configuring the database to maintain indexes on the four locator data elements, and establishing a range for each element based on the configured origin and destination radii, the query optimizer is most efficiently able to select only that subset of stored routes that are mathematically certain to contain the preferable stored routes. The standard SQL query optimizer will count the number of satisfying index entries for each segment of the clause, identify the segment yielding the fewest satisfying entries, and then apply that segment to retrieve the full set of data elements from the file and perform the calculations stated in the select clause. A potential enhancement to the query optimizer would be for it to evaluate the segments of the where clause serially and not to count the number of satisfying index entries for any subsequent segment beyond the total number already counted for a prior segment. Assuming that feature were enabled, and given that Human population is distributed predominantly on the Earth's surface in bands of latitude, it may be more efficient to perform the longitude range selections before the latitude range selections. Additional non-spatial attributes may be relevant to the application. Such non-spatial attributes should be configured in the secondary indexes preceding the spatial data element to maximize the efficiency of the retrieval process. For example, in the present depiction, the query optimizer will only select each range of spatial data elements within the pool of stored routes containing the desired values for STATUS and GROUP.

The having clause performs a secondary selection based on retrieved and calculated data elements. In this case, it is used to trim off the corners of the box formed by the range selections in the where clause, using the origin and destination ranges applicable at the average latitudes of the origins and destinations to approximate efficiently the best possible circle around the required origin and the required destination. The reason to do this is because points lying outside the circle and inside the box may actually be farther away than points outside the box and outside the circle but closer to the intersections of the circle and box, and these points and routes trimmed away by the having clause could not be confidently included as the preferable routes because some more preferable routes be outside the box and therefore not included in the current set of results.

The order by clause specifies the data element to be used for ordering the results. The selected routes are ordered by the route proximity indicator selected by the user.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. In a computer mapping program, a method for identifying a stored route to be used for a given required route, comprising: receiving a new required route; and identifying a preferable stored route in a plurality of stored routes, the preferable stored route minimizing the sum of the length of a line connecting the origins of the stored route and the required route and the length of a line connecting the destinations of the stored route and the required route, wherein the preferable route minimizes the difference from the required route to the stored route, calculated by the method of: calculating the distance between the required route origin and the stored route origin to achieve a first value; calculating the distance between the stored route origin and the stored route destination to achieve a second value; calculating the distance between the stored route destination and the required route destination to achieve a third value; adding the first value and the second value and the third value to achieve a fourth value; calculating the distance between the required route origin and the required route destination to achieve a fifth value; and subtracting the fifth value from the fourth value to determine the difference from the required route to the stored route.

2. The method of claim 1, wherein all stored routes are evaluated and ordered by the difference from the required route to each stored route, this ordered list then being identified as the ordered most preferable routes by detour from the required route to the stored routes.

3. In a computer mapping program, a method for identifying a stored route to be used for a given required route, comprising: receiving a new required route; and identifying a preferable stored route in a plurality of stored routes, the preferable stored route minimizing the sum of the length of a line connecting the origins of the stored route and the required route and the length of a line connecting the destinations of the stored route and the required route, wherein the preferable route minimizes the difference from the stored route to the required route, calculated by the method of: calculating the distance between the stored route origin and the required route origin to achieve a first value; calculating the distance between the required route origin and the required route destination to achieve a second value;

calculating the distance between the required route destination and the stored route destination to achieve a third value; adding the first value and the second value and the third value to achieve a fourth value; calculating the distance between the stored route origin and the stored route destination to achieve a fifth value; and subtracting the fifth value from the fourth value to determine the difference from the stored route to the required route.

4. The method of claim 3, wherein all stored routes are evaluated and ordered by the difference from each stored route to the required route, this ordered list then being identified as the ordered most preferable routes by detour from the stored routes to the required route.

5. In a computer mapping program, a method for identifying a stored route to be used for a given required route, comprising: receiving a new required route; and identifying a preferable stored route in a plurality of stored routes, the preferable stored route minimizing the sum of the length of a line connecting the origins of the stored route and the required route and the length of a line connecting the destinations of the stored route and the required route, wherein the preferable route minimizes the difference from the stored route to the required route and the difference from the required route to the stored route, calculated by the method of: determining the difference from the required route to the stored route to achieve a first value; determining the difference from the stored route to the required route to achieve a second value; and selecting the lower of the first and second values to determine the minimum route difference.

6. The method of claim 5, wherein all stored routes are evaluated and ordered by the minimum route difference, this ordered list then being identified as the ordered most preferable routes by the minimum route difference.

7. In a computer mapping program, a method for identifying a stored route to be used for a given required route, comprising: receiving a new required route; and identifying a preferable stored route in a plurality of stored routes, the preferable stored route minimizing the sum of the length of a line connecting the origins of the stored route and the required route and the length of a line connecting the destinations of the stored route and the required route, wherein a plurality of required routes are each processed individually and sequentially by the steps described.

8. A computer-readable medium have computer executable instructions for identifying a stored route to be used for a given route requirement, which when executed, comprise: receiving a new required route; and identifying a preferable stored route in a plurality of stored routes, the preferable stored route minimizing the sum of the length of a line connecting the origins of the stored route and the required route and the length of a line connecting the destinations of the stored route and the required route, wherein the preferable route minimizes the difference from the required route to stored route, calculated by the method of: calculating the distance between the required route origin and the stored route origin to achieve a first value; calculating the distance between the stored route origin and the stored route destination to achieve a second value; calculating the distance between the stored route destination and the required route destination to achieve a third value; adding the first value and the second value and the third value to achieve a fourth value; calculating the distance between the required route origin and the required route destination to achieve a fifth value; and subtracting the fifth value from the fourth value to determine the difference from the required route to the stored route.

9. The computer-readable medium of claim 8, wherein all stored routes are evaluated and ordered by the difference from the required route to each stored route, this ordered list then being identified as the ordered most preferable routes by detour from the required route to the stored routes.

10. A computer-readable medium have computer executable instructions for identifying a stored route to be used for a given route requirement, which when executed, comprise: receiving a new required route; and identifying a preferable stored route in a plurality of stored routes, the preferable stored route minimizing the sum of the length of a line connecting the origins of the stored route and the required route and the length of a line connecting the destinations of the stored route and the required route, wherein the preferable route minimizes the difference from the stored route to the required route, calculated by the method of: calculating the distance between the stored route origin and the required route origin to achieve a first value; calculating the distance between the required route origin and the required route destination to achieve a second value; calculating the distance between the required route destination and the stored route destination to achieve a third value; adding the first value and the second value and the third value to achieve a fourth value; calculating the distance between the stored route origin and the stored route destination to achieve a fifth value; and subtracting the fifth value from the fourth value to determine the difference from the stored route to the required route.

11. The computer-readable medium of claim 10, wherein all stored routes are evaluated and ordered by the difference from each stored route to the required route, this ordered list then being identified as the ordered most preferable routes by detour from the stored routes to the required route.

12. A computer-readable medium have computer executable instructions for identifying a stored route to be used for a given route requirement, which when executed, comprise: receiving a new required route; and identifying a preferable stored route in a plurality of stored routes, the preferable stored route minimizing the sum of the length of a line connecting the origins of the stored route and the required route and the length of a line connecting the destinations of the stored route and the required route, wherein the preferable route minimizes the difference from the stored route to the required route and the difference from the required route to the stored route, calculated by the method of: determining the difference from the required route to the stored route to achieve a first value; determining the difference from the stored route to the required route to achieve a second value; and selecting the lower of the first and second values to determine the minimum route difference.

13. The computer-readable medium of claim 12, wherein all stored routes are evaluated and ordered by the minimum route difference, this ordered list then being identified as the ordered most preferable routes by the minimum route difference.

14. A computer-readable medium have computer executable instructions for identifying a stored route to be used for a given route requirement, which when executed, comprise: receiving a new required route; and identifying a preferable stored route in a plurality of stored routes, the preferable stored route minimizing the sum of the length of a line connecting the origins of the stored route and the required route and the length of a line connecting the destinations of the stored route and the required route, wherein a plurality of required routes are each processed individually and sequentially by the computer-executable instructions described.

* * * * *